(12) United States Patent
Willis et al.

(10) Patent No.: US 6,785,072 B1
(45) Date of Patent: Aug. 31, 2004

(54) DISC DRIVE STICTION/FRICTION CHARACTERIZATION UTILIZING PIEZOELECTRIC MICROACTUATORS

(75) Inventors: Raymond L. Willis, Edmond, OK (US); Travis D. Fox, Norman, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/539,263

(22) Filed: Mar. 30, 2000

Related U.S. Application Data
(60) Provisional application No. 60/145,505, filed on Jul. 23, 1999.

(51) Int. Cl.[7] .............................................. G11B 27/36
(52) U.S. Cl. ........................................ 360/31; 360/55
(58) Field of Search .......................... 360/31, 137, 230; 73/9, 7

(56) References Cited

U.S. PATENT DOCUMENTS

| | | | |
|---|---|---|---|
| 4,532,802 A | 8/1985 | Yeack-Scranton et al. | 73/432 R |
| 5,034,828 A | 7/1991 | Ananth et al. | 360/75 |
| 5,168,412 A | * 12/1992 | Doan et al. | 360/137 |
| 5,572,386 A | 11/1996 | Ananth et al. | 360/103 |
| 5,708,540 A | 1/1998 | Ananth et al. | 360/103 |
| 5,796,558 A | * 8/1998 | Hanrahan et al. | 360/294.6 |
| 5,859,357 A | * 1/1999 | Kameyama et al. | 73/9 |
| 6,172,838 B1 | * 1/2001 | Ohba | 360/77.04 |
| 6,256,172 B1 | * 7/2001 | Griesbach | 360/246 |
| 6,299,947 B1 | * 10/2001 | Suzuki et al. | 427/555 |
| 6,344,949 B1 | * 2/2002 | Albrecht et al. | 360/236.5 |
| 6,501,625 B1 | * 12/2002 | Boismier et al. | 360/294.74 |

* cited by examiner

*Primary Examiner*—David Hudspeth
*Assistant Examiner*—Rocio Colon
(74) *Attorney, Agent, or Firm*—Kirk A. Cesari

(57) ABSTRACT

A disc drive includes a base and a disc rotatably attached to the base. The disc drive also includes an actuator assembly rotatably attached to the base and a device for moving the actuator assembly. The actuator assembly includes an arm carrying a transducer head in a transducing relationship with respect to the disc. The disc drive further includes a servo circuitry and a controller for controlling movement of the actuator assembly during a track follow and a track seek. Piezoelectric transducers are attached to the actuator assembly for non-intrusive measurement of stiction and friction forces developed between the transducer head and the disc during a disc drive spin-up.

11 Claims, 5 Drawing Sheets

DISC DRIVE STICTION/FRICTION CHARACTERIZATION UTILIZING PIEZOELECTRIC MICROACTUATORS

RELATED APPLICATION

This application claims the benefit of U.S. Provisional Application Serial No. 60/145,505, filed Jul. 23, 1999 under 35 U.S.C. 119(e).

FIELD OF THE INVENTION

The present invention relates to the field of mass storage devices. More particularly, this invention relates to a method of characterizing a disc drive stiction/friction during the disc drive spin-up.

BACKGROUND OF THE INVENTION

One key component of any computer system is a device to store data. Computer systems have many different places where data can be stored. One common place for storing massive amounts of data in a computer system is on a disc drive. The most basic parts of a disc drive are an information storage disc that is rotated, an actuator that moves a transducer head to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer head is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track. The data is divided or grouped together on the tracks. In some disc drives, the tracks are a multiplicity of concentric circular tracks. In other disc drives, a continuous spiral is one track on one side of disc drive. Servo feedback information is used to accurately locate the transducer head. The actuator assembly is moved to the required position and held very accurately during a read or write operation using the servo information.

The actuator/arm is rotatably attached to a shaft via a bearing cartridge which generally includes one or more sets of ball bearings. The shaft/post is attached to the base and may be attached to the top cover of the disc drive. A yoke is attached to the actuator. The voice coil is attached to the yoke at one end of the rotary actuator. The voice coil is part of a voice coil motor which is used to rotate the actuator and the attached transducer or transducers. A permanent magnet is attached to the base and cover of the disc drive. The voice coil motor which drives the rotary actuator comprises the voice coil and the permanent magnet. The voice coil is attached to the rotary actuator and the permanent magnet is fixed on the base. A yoke is generally used to attach the permanent magnet to the base and to direct the flux of the permanent magnet. Since the voice coil sandwiched between the magnet and yoke assembly is subjected to magnetic fields, electricity can be applied to the voice coil to drive it so as to position the transducers at a target track.

Tribological qualifications of the head-disc interface is generally a critical path to final qualification of both the head and the disc during the design and development stage of new disc drives. Current methods to measure stiction and friction between the head and the disc during the disc drive spin-up are generally intrusive and very time-consuming. This can result in considerable loss of time during the design and development stage of the disc drives. Currently there is no non-intrusive and reliable method of characterizing stiction and friction between the head and the disc during the disc drive spin-up. Current methods require significant drive and connection modifications to make these measurements. Almost all of the existing methods to quantify stiction and friction require removing the top-cover of the disc drive to make these measurements. In addition to removing the top cover of the disc drive assembly, one method requires attaching a string to the spindle motor, and pulling a string with a strain gauge while holding the drive stationary. The output of the strain gauge is recorded via a strip chart recorder to quantify the stiction and friction forces. Most other current methods for characterizing stiction and friction between the head and the disc require significant disc drive modifications before making any measurement. One such method includes spinning the disc drive about its spindle-motor z-axis, and measuring the rotational acceleration point at which stiction and friction values are exceeded. This method requires time-consuming hardware mounting and disc drive balancing of each disc drive in the measurement apparatus. Another method requires measuring motor current at which the disc drive breaks free of the head and-disc contact (stiction and friction) and begins to spin. This method requires the connection of a special disc drive circuitry to measure and output the breakaway motor current. Also this special disc drive circuitry must be configured and calibrated for each product independently before making any measurements. All of these current methods to characterize stiction and friction between the head and the disc are intrusive and time-consuming. Also these methods raise potential handling and contamination issues for disc drive assemblies, which are generally hermetically sealed.

What is needed is a reliable non-intrusive method to characterize stiction and friction between a head and a disc during a disc drive spin-up for disc drive assemblies, that is not time consuming, that does not require modifications to disc drive assemblies, and that does not raise any handling and contamination issues.

SUMMARY OF THE INVENTION

A disc drive includes a base, and a disc rotatably attached to the base. The disc drive also includes an actuator assembly rotatably attached to the base, and a device for moving the actuator assembly. The actuator assembly includes an arm carrying a transducer head in a transducing relationship with respect to the disc. The disc drive further includes a servo circuitry and a controller for controlling movement of the actuator assembly during a track follow and a track seek. Piezoelectric transducers are attached to the actuator assembly for measuring stiction and friction forces developed between the transducer head and the disc during a disc drive spin-up. In one embodiment the piezoelectric transducers are part of the actuator assembly. The disc drive further includes an internal lead, coupled to piezoelectric transducers on one end and, and disposed to extend outside the disc drive on other end for non-intrusive coupling with an external processor. During a disc drive spin-up, signals generated by the piezoelectric transducers are received by the external processor through the internal lead, and analyzed to characterize the stiction and friction forces developed between the transducer head and the disc.

Advantageously, the non-intrusive method of characterizing the stiction and friction forces developed between the transducer head and the disc during the disc drive spin-up set forth above, and the apparatus for implementing the above non-intrusive measurement procedure, allow for making faster measurements and virtually eliminate any potential handling and contamination issues that can occur in current intrusive methods of making the stiction and friction measurements. The end result will be a method of characterizing stiction and friction in a disc drive, that is non-intrusive, that is not time consuming, that does not require modifications to disc drive, and that does not raise any potential handling and contamination issues during stiction and friction measurements.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
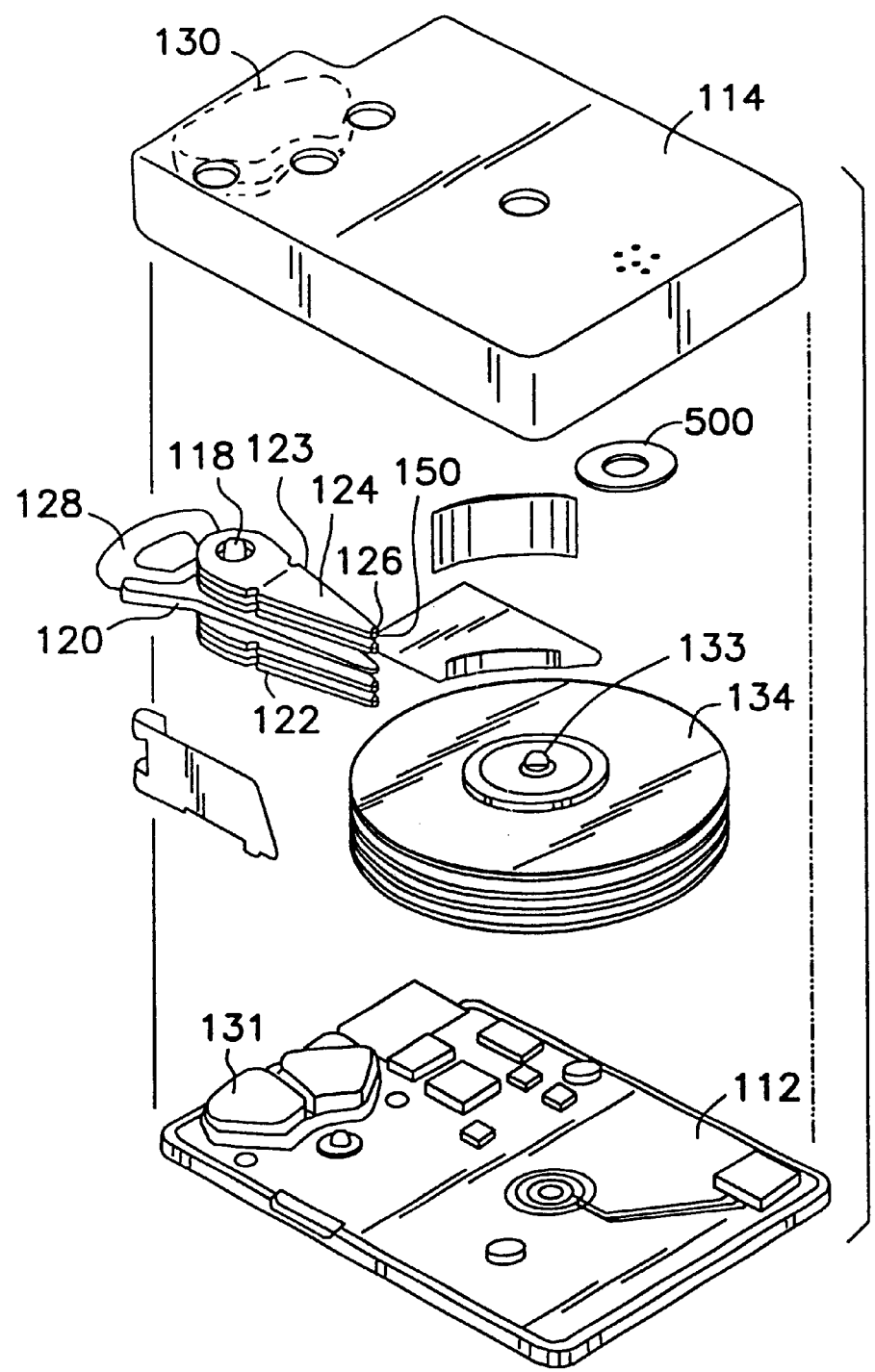
FIG. 1 is an exploded view of a disc drive with a multiple disc stack.

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable. FIG. 1 is an exploded view of one type of a disc drive 100 having a rotary actuator. The disc drive 100 includes a housing or base 112, and a cover 114. The base 112 and cover 114 form a disc enclosure. An inertia ring 500 is attached to the cover 114. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator arm assembly 120 opposite the load springs 124 and the sliders 126 is a voice coil 128.

Attached within the base 112 is a first magnet 130 and a second magnet 131. As shown in FIG. 1, the first magnet 131 is associated with the cover 114. The first and second magnets 130, 131, and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. In other disc drives a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or under the hub.

Figure 2:
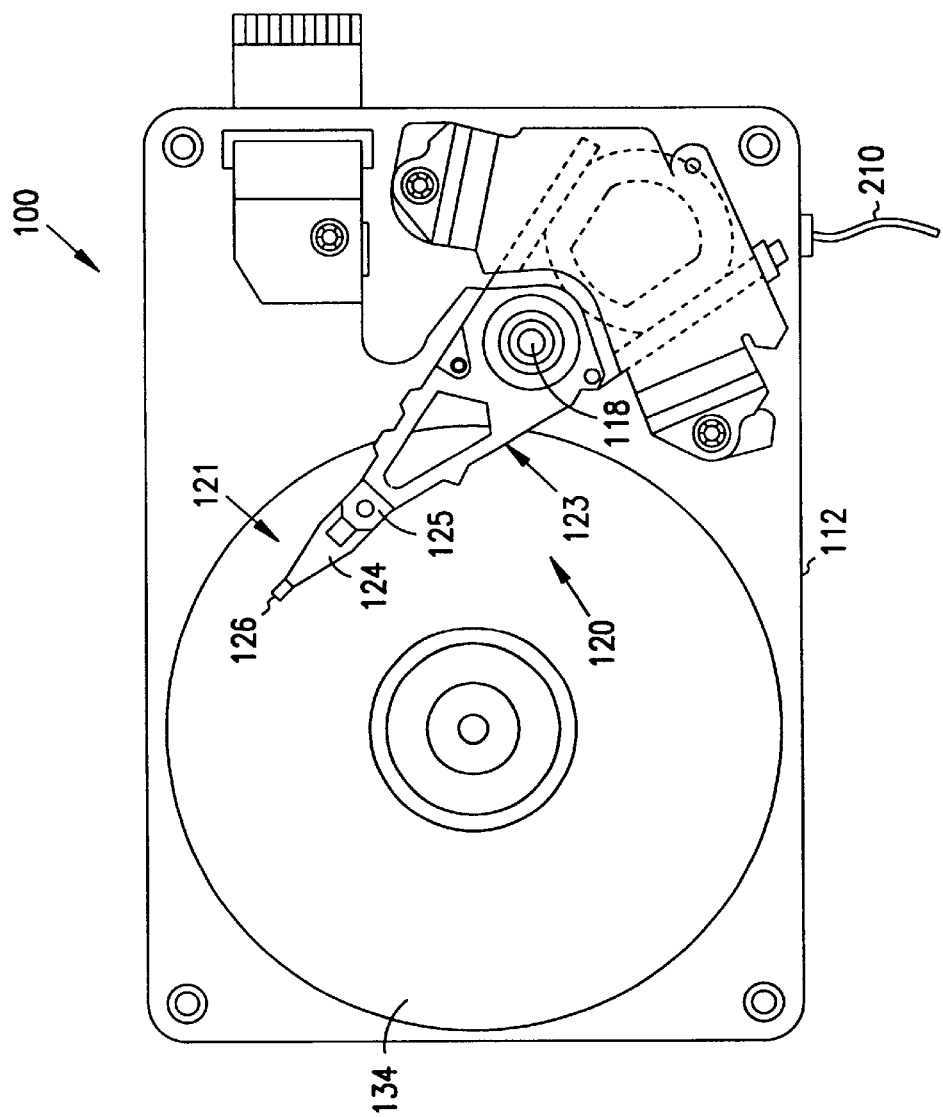
FIG. 2 is a schematic view of a disc drive shown without a top cover.

FIG. 2 is a schematic representation of one embodiment of a disc drive 100 shown without the top cover 114. In this embodiment, the disc drive 100 includes at least one disc 134 rotatably attached to a base 112. Also shown rotatably attached to the base 112 on an actuator shaft 118 is an actuator assembly 120. Actuator assembly 120 shown in FIG. 2 includes an arm 123, a base plate 125, and a transducer head 121, attached to one end of the arm 123 for carrying a transducer in transducing relation with respect to the disc 134. The transducer head further includes a load beam 124, and a slider attached to one end of the load beam 124 for carrying the transducer (not shown) in transducing relation with respect to the disc 134. Also shown is the disc drive 100 including an internal lead 210 coupled to the piezoelectric transducers on one end, and disposed to extend the other end outside the disc drive for a non-intrusive coupling with an external processor for characterizing the stiction and friction forces developed between the transducer head and the disc during a disc drive spin-up.

Figure 3:
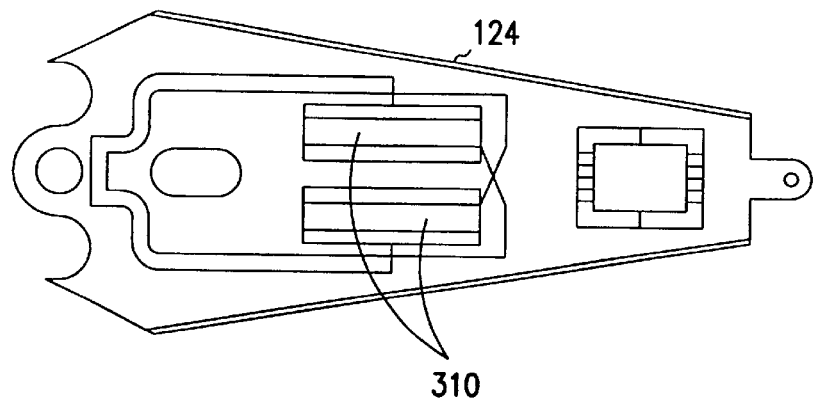
FIG. 3 is a schematic view showing piezoelectric transducers attached to a bottom of a load beam.

FIG. 3 is a schematic showing one embodiment of attaching piezoelectric transducers 310 to a bottom of a load beam 124 for measuring stiction and friction forces between a transducer head 121 and a disc 134 during a disc drive spin-up.

Figure 4:
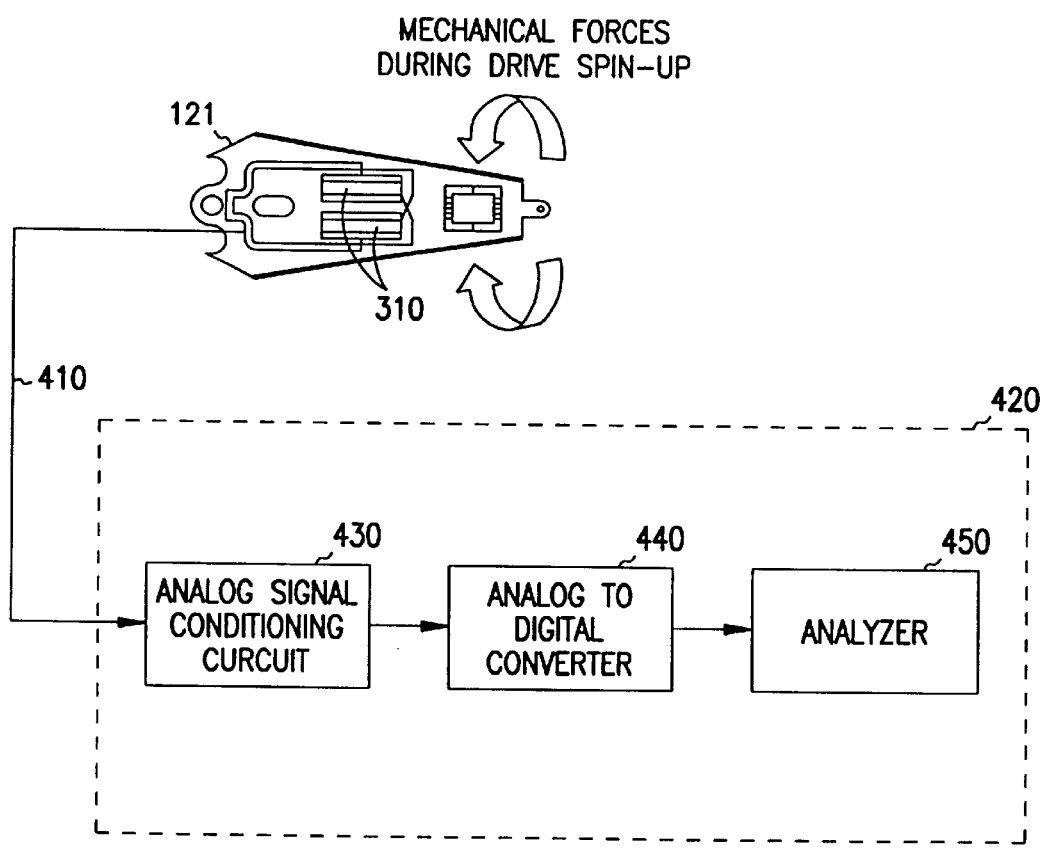
FIG. 4 is a schematic representation of a load beam with piezoelectric transducers attached to a bottom of the load beam including portions of an external processor used to sense and analyze the signals for stiction and friction forces.

FIG. 4 is a schematic similar to FIG. 3, showing one embodiment of attaching piezoelectric transducers 310 to a bottom of a load beam 124. In addition to what is shown in FIG. 3, FIG. 4 shows the coupling of an external processor 420 to the piezoelectric transducers 310 via an external communication lead 410 for sensing and analyzing the signals for stiction and friction developed during a disc drive spin-up. As shown in FIG. 4, the external processor 420 further includes an analog signal conditioning circuit 430, to filter and amplify (condition) the signals of interest coming from the piezoelectric transducers 310. An analog-to-digital converter 440 coupled to the analog signal conditioning circuit 430, converts the conditioned signal to a digital signal. An analyzer 450, coupled to the analog-to-digital converter 440, analyzes the digitized signal for stiction and friction forces developed during the disc drive spin-up. In one embodiment, the disc drive 100 includes an internal lead 210. One end of an internal lead 210 is coupled to the piezoelectric transducers, and the other end of the internal lead 210 is disposed to extend outside the disc drive for coupling with the external communication lead 410. This eliminates the need to remove the top cover of the disc drive assembly 114 to operatively couple the piezoelectric transducers with an external processor 420, and thereby eliminating any potential handling and contamination issues that can arise due to the removal of the top cover 114 and handling of inside of the disc drive.

Figure 5:
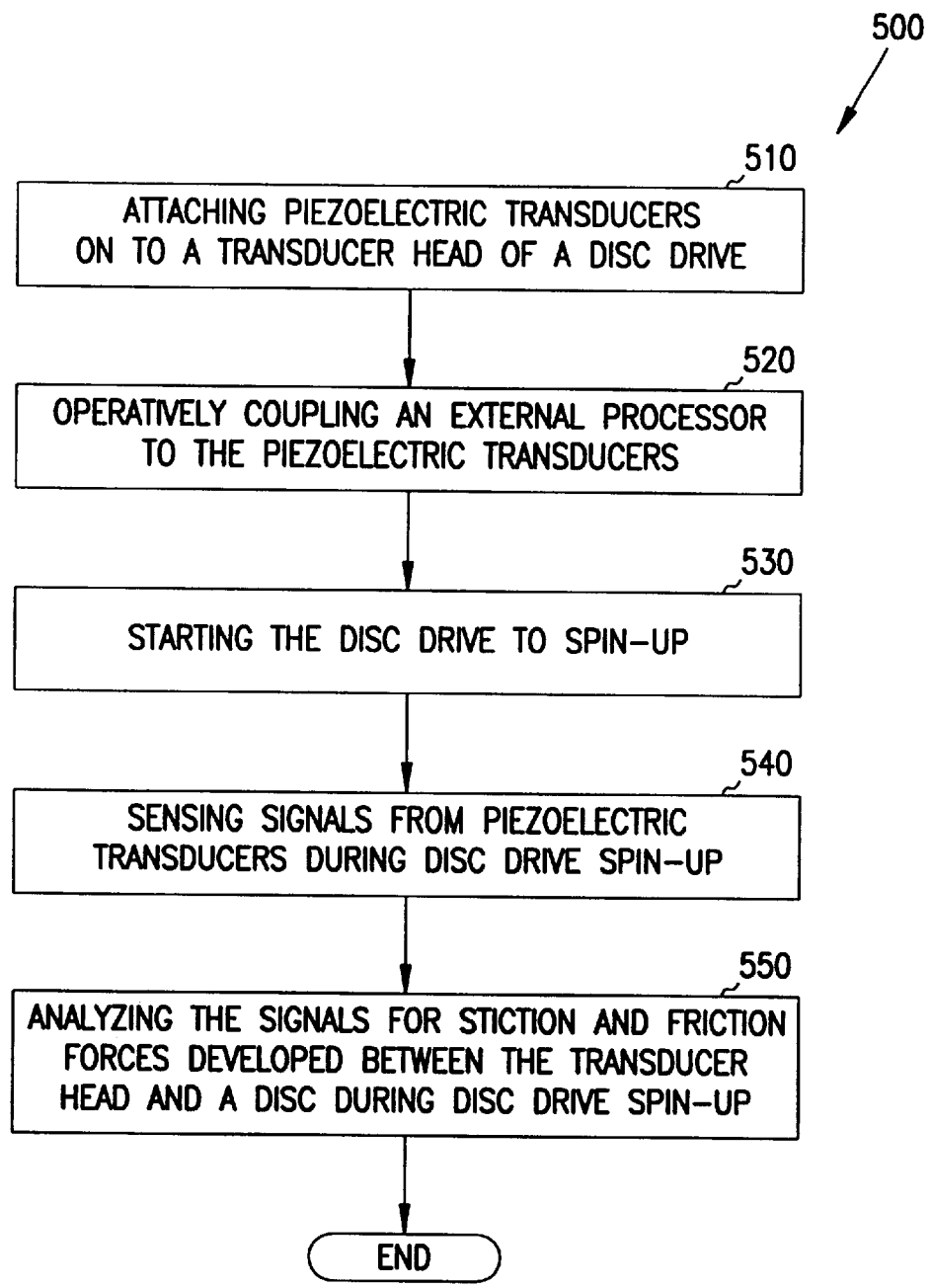
FIG. 5 is a flow diagram of the stiction and friction measurement procedure of the instant invention.

FIG. 5 is a flow diagram outlining the method of characterizing the stiction and friction forces using piezoelectric transducers 500 of the present invention. The first step in the method of characterizing the stiction and friction forces using piezoelectric transducers 500 is to attach piezoelectric transducers on to a transducer head of a disc drive 510. In one embodiment the piezoelectric transducers are attached to a load cell of the transducer head. In another embodiment the piezoelectric transducers are attached to a load beam of the transducer head. In another embodiment the piezoelectric transducers are attached to an arm of the transducer head. In another embodiment the piezoelectric transducers are attached to an arm 123 of the disc drive. In another embodiment the piezoelectric transducers are part of the actuator assembly. After attaching the piezoelectric transducers 310 to the transducer head 124, the piezoelectric transducers 310 are operatively coupled to an external processor 520. In one embodiment an internal lead 210 is coupled to the piezoelectric transducers 310 on one end and the other end of the internal lead 210 is disposed to extend outside the disc drive assembly to operatively couple an external processor 410. This eliminates the need to remove the top cover 114 of the disc drive, thereby eliminating any potential handling and contamination issues that can arise due to the removal of the top cover 114 and handling of inside of the disc drive After coupling the piezoelectric transducers 310 to an external processor 420, the disc drive is started to spin-up 530. During the disc drive spin-up, the signals coming from the piezoelectric transducers 310 are sensed by the external processor 540. In one embodiment, the external processor 420 conditions the sensed signals by filtering and amplifying signals of interest. The conditioned signals are then digitized by an analog-to-digital converter. The digitized signals are then analyzed for stiction and friction forces developed during the disc drive spin-up. In one embodiment the digitized signals are fed to a personal computer for analyzing the signals for stiction and friction forces.

The simple illustration above demonstrates how the stiction and friction measurements can be made during a disc drive spin-up without having to make any modifications, or mount any time consuming hardware to a disc drive.

Advantageously, the non-intrusive stiction and friction characterization method and apparatus set forth above allow for making the stiction and friction measurements faster and more reliably. The present invention does not require any disc drive modifications, or mounting any time consuming hardware. The end result will be a non-intrusive method to characterize stiction and friction forces in the disc drive, that can significantly reduce time for making stiction and friction measurements, and eliminate any potential handling and contamination issues that can raise in the intrusive methods of making stiction and friction measurements.

Figure 6:
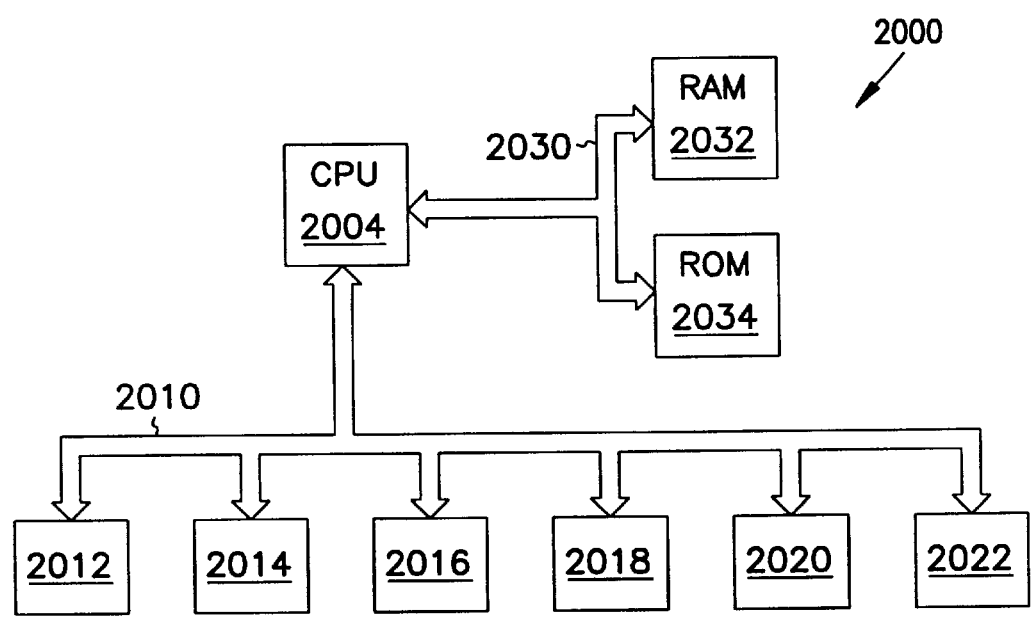
FIG. 6 is a schematic view of a computer system.

FIG. 6 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 includes a disc drive device which includes the ramp described above. The information handling system 2000 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the method for loading or unloading the slider onto the disc surface as described above.

Conclusion

In conclusion, a disc drive 100 includes at least one disc 134 rotatably attached to a base 112. Also rotatably attached to the base 112 on an actuator shaft 118 is an actuator assembly 120. Actuator assembly 120 includes an arm 123, a base plate 125 attached to one end of the arm 123, a load beam 124 further attached to the same end of the arm 123, and a slider attached to one end of the load beam 124. Piezoelectric transducers 310 are attached to a bottom of the load beam 124 for measuring stiction and friction forces during a disc drive spin-up. The piezoelectric transducers 310 are coupled to an external processor 410 via an external communication lead 410 for sensing and analyzing the signals for stiction and friction developed during a disc drive spin-up. The external processor 410 further includes an analog signal conditioning circuit 430, to filter and amplify (condition) signals of interest coming from the piezoelectric transducers 310. The conditioned signal is digitized by an analog-to-digital converter 440. The digitized signal is analyzed by an analyzer 450 for characterizing stiction and friction forces developed between a transducer head 121 and a disc 134 during the disc drive spin-up.

The method of characterizing the stiction and friction forces using piezoelectric transducers 500 of the present invention includes the step of attaching piezoelectric transducers on to the transducer head 121 of a disc drive 510. In some embodiment the piezoelectric transducers are be attached to an arm 118, a load cell or a load beam 124 of the transducer head 121. After attaching the piezoelectric transducers 310 to the transducer head 121, the piezoelectric transducers are operatively coupled to an external processor 520. In one embodiment the external processor is coupled to the piezoelectric transducers via an internal lead 210 disposed outside a disc drive 100. This can eliminate any potential handling and contamination issues that can result in coupling an external communication lead 410 to the piezoelectric transducers. After coupling the piezoelectric transducers to an external processor 420, the disc drive 100 is started to spin-up 530. During the spin-up of the disc drive, the signals coming from the piezoelectric transducers 310 are sensed by the external processor 540. In one embodiment, the sensed signals are conditioned by filtering and amplifying the signals of interest, and further digitized by an analog-to-digital converter, and then analyzed for stiction and friction forces developed during the disc drive spin-up.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method of measuring stiction and friction forces developed between a transducer head and a disc during a spin-up, comprising steps of:
    (a) attaching a piezoelectric transducer on to an actuator assembly supporting the head;
    (b) coupling an external processor to the piezoelectric transducer;
    (c) starting the disc to spin-up;
    (d) sensing signals from the piezoelectric transducer during the disc spin-up; and
    (e) analyzing the signals for the stiction and friction forces developed between the transducer head and the disc during the spin-up, the analyzing step comprising:
        (e)(i) conditioning the signals coming from the piezoelectric transducer by filtering and amplifying signals of interest from the sensed signals coming from the piezoelectric transducer;
        (e)(ii) converting the conditioned signals to digital signals; and
        (e)(iii) analyzing the digitized signals for stiction and friction forces.

2. The method of claim 1, wherein the attaching step (a) includes the step of attaching the piezoelectric transducer to an arm of the actuator assembly.

3. The method of claim 1, wherein the attaching step (a) includes the step of attaching the piezoelectric transducer to a base plate of the actuator assembly.

4. The method of claim 1, wherein the attaching step (a) includes the step of attaching the piezoelectric transducer to a transducer head of the actuator assembly.

5. The method of claim 4, wherein the attaching step (a) includes the step of attaching the piezoelectric transducer to a load beam of the transducer head.

6. The method of claim 4, wherein attaching step (a) includes the step of attaching the piezoelectric transducer to a slider attached to one end of the load beam.

7. The method of claim 1, wherein the coupling step (b) includes the step of (b)(i) coupling the external processor to an end of an internal lead extending to the piezoelectric transducer.

8. The method of claim 1, wherein the analyzing step (e) further includes the step of (e)(i) automatically analyzing the signals to quantify the stiction and friction forces.

9. A data storage device, comprising:
    a base;
    a transducer;
    a disc rotatably attached to the base;
    an arm for carrying the transducer in transducing relation with respect to the disc;
    a piezoelectric transducer, attached to the arm for measuring the stiction and friction forces developed during a spin-up; and
    an external processor coupled to the piezoelectric transducer for sensing and analyzing signals coming from the piezoelectric transducer for stiction and friction forces developed during the spin-up, the processor comprising:
        an analog signal conditioning circuit to condition the sensed signals by filtering and amplifying signals of interest from the sensed signals coming from the piezoelectric transducer;
        an analog-to-digital converter, coupled to the analog signal conditioning circuit, converting the conditioned sensed signals to digital signals; and
        an analyzer, coupled to the analog-to-digital converter, analyzing the digitized signals for stiction and friction forces developed during the spin-up.

10. The data storage device of claim 9, wherein the piezoelectric transducer includes a piezoelectric micro-actuator device.

11. The data storage device of claim 9, further comprises an internal lead having a first end and a second end, wherein the first end of the internal lead extends outside the base for a non-intrusive external coupling with the external processor.

* * * * *